(12) United States Patent
Dickman

(10) Patent No.: US 6,411,863 B1
(45) Date of Patent: Jun. 25, 2002

(54) AUXILIARY CONTROL SYSTEM FOR USE WITH PROGRAMMABLE LOGIC CONTROLLER IN A PRESS MACHINE

(75) Inventor: Charles H. Dickman, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/184,559

(22) Filed: Nov. 2, 1998

(51) Int. Cl.[7] .............................................. G06F 19/00
(52) U.S. Cl. .......................... 700/206; 700/165; 700/2; 700/19; 700/203; 700/204; 72/3; 72/6.1; 72/420; 72/421; 101/123; 101/129
(58) Field of Search ........................... 700/18, 19, 165, 700/197, 198, 199, 200–202, 204, 206, 83, 145, 26, 27, 28, 29, 30, 31, 32, 2, 123–126; 19/219, 248; 72/1–3, 420–422, 19.4, 6.1; 101/129

(56) References Cited

U.S. PATENT DOCUMENTS

| 3,628,357 A | 12/1971 | Luenser |
| 3,749,005 A | 7/1973 | Einecker et al. |
| 4,013,002 A | 3/1977 | Schneider et al. |
| 4,026,204 A | 5/1977 | Good |
| 4,113,079 A | 9/1978 | Wright |
| 4,195,722 A | 4/1980 | Anderson et al. |
| 4,211,098 A | 7/1980 | Luenser |
| 4,275,455 A | 6/1981 | Bartlett |
| 4,378,592 A | * 3/1983 | Heiberger et al. .......... 700/206 |
| 4,387,632 A | 6/1983 | Heiberger |
| 4,429,627 A | 2/1984 | Edsö |
| 4,651,273 A | 3/1987 | Braitinger et al. |
| 4,676,421 A | 6/1987 | Swanstrom |
| 4,939,655 A | 7/1990 | Gold et al. |
| 4,987,528 A | 1/1991 | O'Brien |
| 5,079,738 A | * 1/1992 | Bockenfeld ................. 709/252 |
| 5,086,965 A | 2/1992 | Marsteller et al. |
| 5,119,311 A | 6/1992 | Gold et al. |
| 5,142,769 A | 9/1992 | Gold et al. |
| 5,224,053 A | 6/1993 | Cook |
| 5,233,697 A | 8/1993 | Yamauchi |
| 5,260,878 A | * 11/1993 | Luppy ........................ 700/204 |
| 5,285,721 A | 2/1994 | Sugimoto et al. |
| 5,331,831 A | 7/1994 | Schneider |
| 5,468,194 A | 11/1995 | Hayashi |
| 5,483,874 A | 1/1996 | Shimizu et al. |
| 5,491,647 A | 2/1996 | O'Brien et al. |
| 5,564,298 A | * 10/1996 | DeMeo ....................... 72/19.8 |
| 5,592,733 A | 1/1997 | Wareham |
| 5,594,917 A | 1/1997 | Palermo et al. |
| 5,613,115 A | 3/1997 | Gihl et al. |
| 5,615,104 A | 3/1997 | Takai et al. |
| 5,622,069 A | 4/1997 | Walters |
| 5,634,398 A | 6/1997 | McGee et al. |
| 5,791,852 A | * 8/1998 | Bibby et al. ................. 414/278 |
| 6,047,579 A | * 4/2000 | Schmitz ...................... 72/15.1 |
| 6,122,565 A | * 9/2000 | Wenning et al. ............ 700/206 |

* cited by examiner

Primary Examiner—Ramesh Patel
(74) Attorney, Agent, or Firm—Randall J. Knuth

(57) ABSTRACT

An auxiliary control system is operatively associated with a press machine controller including a programmable logic controller having a main processor. The auxiliary control system includes a sensor assembly arranged to provide sensor information which is representative of the condition of the press machine. An auxiliary processor is arranged to monitor for the occurrence of press operating events as signified by the sensor information. The auxiliary processor provides a state signal to the press controller which is representative of the results of the monitoring activity to enable the PLC to control the press machine. Additionally, an improved press machine PLC includes an auxiliary sensor assembly for providing sensor information which is representative of the condition of the press machine. An auxiliary logic processor is arranged to perform logic operations in respect of the sensor information and to generate control signals based upon the logic operations performance results for use in controlling the press machine. An auxiliary output device is arranged to interface the auxiliary logic processor with the machine actuators to enable communication therebetween.

56 Claims, 5 Drawing Sheets

AUXILIARY CONTROL SYSTEM FOR USE WITH PROGRAMMABLE LOGIC CONTROLLER IN A PRESS MACHINE

BACKGROUND OF THE INVENTION

1. Field of the Invention

The present invention relates generally to control systems associated with a mechanical press machine, and, more particularly, to an auxiliary control system arranged for use with a programmable logic controller to provide a dedicated, high-performance press controller.

2. Description of the Related Art

Mechanical press machines operate in an industrial environment in which high levels of power transfer are needed over relatively short processing intervals to deliver high impact shaping forces that act through the die assembly to machine an attached workpiece. Machining operations of this type require a control mechanism that monitors the condition of various parts of the press machine and undertakes whatever corrective action is deemed necessary in the event that any abnormal, substandard, or other impermissible conditions arise either in the functioning of the individual devices of the press machine or in the processing activity involving the die assembly and integral workpiece. Some of the critical features for any such control mechanism include near-instantaneous access to and retrieval of monitoring data, rapid processing of the data to arrive at a control decision, and implementation of the decision within a time frame suitable for preserving the press machine against any irreparable harm or other forms of damage materially affecting the integrity of the machine and its operation. This window of protection clearly depends upon the speed of the press, with press running speeds on the order of 400 strokes per minute (spm) necessitating very short intervals of response. The responsiveness to error detection takes on added importance in situations involving press conditions that progressively worsen in the absence of any countermeasures such as when the die members are mispositioned or misaligned, leading to eventual destruction of the workpiece and die assembly that can be averted only if an immediate shutdown is ordered.

The complexity and speed of the tasks that fall to the press controller for their precise and automatic execution suggests a computer-based implementation in order to take advantage of the processing power, data management, and digital control available with microprocessor control apparatus. The complexity of press operation, in particular, usually becomes a vital focus of the engineering effort and typically leads to a press control design based on a general purpose programmable logic controller (PLC). In one representative PLC arrangement, the PLC processor will issue control commands to the clutch control circuit based upon a logic operations analysis of a group of performance measurements obtained from sensors which detect certain performance indicia (e.g., crankshaft angle) representing the operating condition of the press machine. The clutch control circuit directly controls the clutch valves in accordance with its control state as determined by the control commands issued by the PLC. In this manner the PLC can cause the clutch valves to become deactivated, leading to a disengagement of the flywheel and an accompanying stoppage in the slide motion. However, conventional PLC arrangements suffer from a variety of limitations that affect their ability to adequately manage the control activity and meet the real-time demands of high speed machines.

A typical PLC arrangement employs a backplane to serve as the communications bus for interconnecting the PLC processor with the array of individual input/output devices with which the processor interacts in terms of receiving input data for use in executing the control program and transmitting control data for use in controlling the targeted objects. In a machine application, the input devices would encompass the sensors deployed within the press machine and die assembly while the output devices would include the actuators and other control apparatus (e.g., clutch control circuit) arranged to control corresponding machine parts (e.g., clutch assembly). However, for purposes of press machine applications, backplane communications are not sufficiently fast to handle either the transfer of monitoring information from the sensors to the PLC processor or the transmission of logic control data from the PLC processor to the actuator assembly within the time window needed to accomplish real-time processing. Other factors which contribute to the processing delay of the PLC include the clock speed and the execution time of the control program, which increases in a manner commensurate with the size and number of logic operations programmed for execution by the PLC processor.

These features of the conventional PLC arrangement affecting processing speed come together to establish a response window that defines how fast the PLC can analyze the operating condition of the press machine and then implement control decisions in a manner that provides some level of meaningful synchronism between the detection of a press operating event and the controlled response tailored to the detected event. Though possibly adequate at relatively low speeds, conventional PLC arrangements nevertheless become seriously ineffective at higher operating speeds when the machine demands a narrower response window than the PLC can deliver. Consequently, when the response time is too slow, this means that the PLC processor, among other possibilities, is considered to have missed the occurrence of a critical operating event (e.g., a crankshaft malfunction indicated by an out-of-bound crankshaft angle sensor measurement); responded to the operational crisis in an untimely manner that negated any meaningful impact upon press operation; or responded with a control command that no longer harmonizes with the current condition of the machine because of rapid changes in the machine activity that went undetected by the PLC during the intervening processing period. What is therefore needed is a press controller that enables a more rapid coordination and execution of tasks aligned with monitoring the condition of the press machine and implementing the control decisions derived from an evaluation of the monitoring information.

SUMMARY OF THE INVENTION

According to one embodiment of the present invention there is provided an auxiliary control system operatively associated with a press controller which is arranged to control a press machine. The press controller comprises a programmable logic controller including a main processor. The auxiliary control system includes a sensor assembly arranged to provide sensor information which is representative of the condition of the press machine and a die assembly disposed within the press machine. A monitoring device provided in the form of an auxiliary processor is arranged to monitor for the occurrence of press operating events as signified by the sensor information. The auxiliary processor provides a state signal which is representative of the results of the monitoring activity, namely whether one of the press operating events was detected and an indication of which one(s). The press operating events preferably relate to the functioning of the crankshaft from which a measurement of the crankshaft angle is obtained by the sensor assembly. The state signal is provided to the press controller to enable it to take the appropriate control action based upon the state signal.

According to another embodiment of the present invention there is provided a programmable logic controller for use in controlling a press machine. The programmable logic controller includes a main processor and is operatively associated with an actuator assembly arranged to control devices of the press machine in accordance with a control state thereof. The programmable logic controller (PLC) further includes an auxiliary sensor assembly for providing sensor information which is representative of the condition of the press machine and a die assembly disposed within the press machine. An auxiliary logic processor is arranged to perform logic operations in respect of the sensor information and to generate control signals based upon the logic operations performance results for use in controlling the press machine. An auxiliary output device is arranged to interface the auxiliary logic processor with the device control assembly to enable communication therebetween.

Among other advantageous features, both of the stated embodiments avoid using the backplane of the programmable logic controller in transmitting sensor information from their respective sensor assemblies to their respective processing modules. Additionally, both embodiments perform their respective evaluation activities with respect to the sensor information independently of the control program associated with the operation of the PLC main processor.

The invention, in one form thereof, comprises a control system for use with a press machine. The control system includes a press controller arranged to control the press machine, such press controller comprising a programmable logic controller including a main processor; a sensor means for providing sensor information representative of the condition of at least one of the press machine and a die assembly disposed within the press machine; an auxiliary processor arranged to monitor for the occurrence of at least one press operating event as signified by the sensor information provided by the sensor means and to provide a state signal representative of the results of the monitoring activity; and a means for providing the press controller with the state signal provided by the auxiliary processor to enable the press controller to control the press machine based, at least in part, upon the state signal. At least one of the at least one operating event defines a non-allowable operating state for the press machine. The press controller effects a termination of press machine operation in response to a state signal from the auxiliary processor which indicates the occurrence of an operating event associated with a non-allowable operating state.

There is further provided a connection means for providing a communications path between the sensor means and the auxiliary processor, wherein the connection means is discrete from a signal bus defining, at least in part, a backplane of the programmable logic controller.

The invention, in another form thereof, comprises a system for use in a press machine and operatively associated with a press controller arranged to control the press machine. The system includes, in combination, a sensor means for providing sensor information representative of the condition of at least one of the press machine and a die assembly disposed within the press machine; a monitoring means for monitoring for the occurrence of at least one press operating event using the sensor information provided by the sensor means and for generating a state signal representative of the results of the monitoring activity; and a means for providing the press controller with the state signal generated by the monitoring means to enable the press controller to control the press machine based, at least in part, upon the state signal.

At least one of the at least one operating event defines a non-allowable operating state for the press machine. The sensor information provided by the sensor means includes a measure of the crankshaft angle for the press machine. Additionally, the sensor information provided includes a measure of some other press machine condition, wherein one of the at least one press operating event associated with a non-allowable operating state defines unacceptable values for the press machine condition for the measured crankshaft angle.

The press controller further comprises a programmable logic controller including a main processor, while the monitoring means further comprises an auxiliary processor. The action of the auxiliary processor in conducting the monitoring activity relative to the at least one operating event is independent of the programmable logic controller.

The invention, in another form thereof, includes a system for use in a press machine and operatively associated with a programmable logic controller arranged to control the press machine and including a main processor. The system comprises, in combination, a sensor means for providing sensor information representative of the condition of at least one of the press machine and a die assembly disposed within the press machine; an auxiliary processor means for evaluating the sensor information provided by the sensor means according to evaluation criteria associated with the operation of the press machine and for providing a state signal representative of the evaluation results; and a means for communicating the state signal provided by the auxiliary processor means to the programmable logic controller to enable control of the press machine by the programmable logic controller based, at least in part, upon the state signal.

The evaluation criteria associated with the operation of the auxiliary processor means incorporates representations of at least one press operating event for the press machine. The evaluation performed by the auxiliary processor means monitors for the occurrence of the at least one press operating event and provides an event indicator in the state signal when the occurrence of an operating event is detected. At least one of the at least one press operating event defines a non-allowable operating state for the press machine.

The system further comprises a connection means for providing a communications path between the sensor means and the auxiliary processor means, wherein the connection means is discrete from a signal bus defining, at least in part, a backplane of the programmable logic controller.

The invention, in another form thereof, comprises a method of controlling a press machine, the method operatively associated with a press controller arranged to control the press machine. The method includes the steps of sensing the condition of at least one of the press machine and a die assembly disposed within the press machine and generating sensor information representative thereof; monitoring the generated sensor information for the occurrence of at least one press operating event as signified by the sensor information and providing a state signal representative of the results of the monitoring activity, wherein at least one of the at least one press operating event defines a non-allowable operating state for the press machine; and providing the state signal to the press controller to enable control of the press machine in accordance therewith. The press controller further comprises a programmable logic controller including a main processor. The monitoring step further comprises the step of providing an auxiliary processor arranged to receive the sensor information and to perform the press operating event monitoring activity, wherein the action of the auxiliary processor in performing the monitoring activity relative to the at least one operating event is independent of the programmable logic controller.

The invention, in another form thereof, includes a method of controlling a press machine, the method operatively associated with a press controller, the press controller comprising a programmable logic controller arranged to control the press machine and including a main processor. The method comprises the steps of: providing a sensor assembly to detect the operating condition of at least one of the press machine and a die assembly disposed within the press machine and generating sensor information representative thereof; evaluating the generated sensor information according to evaluation criteria associated with the operation of the press machine and providing a state signal indicative of the results of the evaluation activity; and providing the state signal to the press controller to enable control of the press machine in accordance therewith.

The evaluation step further includes the step of monitoring for the occurrence of at least one press operating event as signified by the generated sensor information, wherein at least one of the at least one press operating event defines a non-allowable operating state for the press machine. The evaluation step even further includes the step of providing an auxiliary processor arranged to receive the sensor information and to perform the evaluation activity. The action of the auxiliary processor in performing the evaluation activity relative to the generated sensor information is independent of the programmable logic controller.

The invention, in another form thereof, comprises an auxiliary control system for use with a press machine, such auxiliary control system associated with a press controller arranged to control the press machine, such press controller including an actuator assembly arranged to provide control of devices of the press machine in accordance with control signals applied thereto and further including a programmable logic controller arranged to operatively control the actuator assembly, such programmable logic controller comprising a host processor having an executable control program associated therewith. The auxiliary control system comprises, in combination, an auxiliary sensor assembly for providing sensor signals representative of the condition of at least one of the press machine and a die assembly disposed within the press machine; an auxiliary logic processor, operatively associated with a control function defining logic operations, for carrying out the logic operations in relation to the sensor signals provided by the auxiliary sensor assembly to generate therefrom control signals enabling control of the press machine; and an auxiliary output device arranged to interface the auxiliary logic processor to the actuator assembly. The press machine control activity performed by the auxiliary logic processor is independent of the executable control program associated with the operation of the host processor of the programmable logic controller. The auxiliary logic processor, in one form thereof, further includes a logic circuit.

The actuator assembly, in one form thereof, further comprises a clutch control circuit arranged to control a clutch assembly of the press machine and having a signal input side and a signal output side. The clutch control circuit, in one form thereof, includes a relay assembly having control inputs and control outputs and operatively arranged to provide clutch control signals along the control outputs thereof in dependence upon the state of the control inputs thereof. The clutch control circuit, in another form thereof, includes an output means for providing an interface between the host processor of the programmable logic controller and the clutch assembly and having signal inputs and signal outputs, the output means responsive to the state of the signal inputs thereof as determined by the host processor for applying clutch control signals on the signal outputs thereof to the clutch assembly. The auxiliary logic processor, in one form thereof, is arranged to communicate directly with the clutch assembly.

The invention, in yet another form thereof, comprises a programmable logic controller for use in controlling a press machine, such programmable logic controller operatively associated with a machine control assembly arranged to provide control of devices of the press machine in accordance with the control state thereof, the programmable logic controller including a central processor for executing a control program in relation to input data to generate control data based upon the control program execution results for use in controlling the press machine. The programmable logic controller further comprises an auxiliary sensor means for providing sensor information representative of the condition of at least one of the press machine and a die assembly disposed within the press machine; an auxiliary processor means for executing an auxiliary control function in respect of sensor information provided by the auxiliary sensor means to provide control information based upon the auxiliary control function execution results for use in controlling the press machine; and an auxiliary output means for applying control signals representative of the control information provided by the auxiliary processor means to the machine control assembly to enable control of the press machine.

The press machine control activity performed by the auxiliary processor means is independent of the control program associated with the operation of the central processor. The auxiliary control function associated with the operation of the auxiliary processor means includes logic operations.

There is further provided an auxiliary connection means for connecting the auxiliary processor means to the auxiliary sensor means and for connecting the auxiliary processor means to the auxiliary output means, wherein the auxiliary connection means is discrete from a signal bus defining, at least in part, a backplane of the programmable logic controller.

The machine control assembly, in one form thereof, further comprises a clutch control circuit arranged to control a clutch assembly of the press machine and having a signal input side and a signal output side. The clutch control circuit, in one form thereof, further includes an output means for providing an interface between the central processor and the clutch assembly and having signal inputs and signal outputs, the output means responsive to the state of the signal inputs as determined by the central processor for applying clutch control signals on the signal outputs thereof to the clutch assembly. The auxiliary processor means, in one form thereof, is arranged to communicate directly with the clutch assembly.

The invention, in yet another form thereof, comprises a control system for use in controlling a press machine. The control system includes, in combination, a device control assembly, including an actuator assembly, arranged to provide control of devices of the press machine in accordance with a control state thereof; a data means for providing press monitoring information representative of the condition of the press machine; and a programmable logic controller arranged to operate the device control assembly. The programmable logic controller comprises, in combination, a main processor operatively associated with an executable control program; an input/output means for interfacing the main processor with the data means and for interfacing the main processor with the device control assembly; and a signal bus defining, at least in part, a backplane of the programmable logic controller for connecting the main processor with the input/output means. The programmable logic controller further comprises, in combination, an auxiliary sensor means for providing sensor information representative of the condition of at least one of the press machine and a die assembly disposed within the press machine; an auxiliary processor means for performing logic operations with respect to the sensor information provided by the auxiliary sensor means to provide control information based upon the logic operations performance results for use in controlling the press machine; and an auxiliary output means for interfacing the auxiliary processor means to the device control assembly. The press machine control activity performed by the auxiliary processor means is independent of the executable control program associated with the operation of the main processor.

The control system further includes an auxiliary connection means for connecting the auxiliary processor means to the auxiliary sensor means and for connecting the auxiliary processor means to the auxiliary output means, wherein the auxiliary connection means is discrete from the signal bus. The auxiliary sensor means, in one form thereof, is discrete from the data means.

The invention, in still yet another form thereof, comprises a programmable logic controller for use in controlling a press machine, the programmable logic controller operatively associated with a device control assembly arranged to control devices of the press machine in accordance with a control state thereof. The programmable logic controller comprises, in combination, a main processor; an auxiliary sensor means for providing sensor information representative of the condition of at least one of the press machine and a die assembly disposed within the press machine; an auxiliary logic processor means arranged to perform logic operations in respect of the sensor information provided by the auxiliary sensor means and to generate control signals based upon the logic operations performance results for use in controlling the press machine; and an auxiliary output device arranged to interface the auxiliary logic processor means with the device control assembly to enable communication therebetween.

The press machine control activity conducted by the auxiliary logic processor means is independent of an executable control program associated with the operation of the main processor.

One advantage of the present invention is that the problems heretofore associated with PLC backplane communications are avoided by an auxiliary control system arrangement in which sensor information is communicated directly to the data processing module.

Another advantage of the present invention is that the dedicated operation of the auxiliary control system vis-à-vis its functional role as a die protection module enhances the control performance of the overall press controller and facilitates a more rapid response to the detection of adverse press operating events.

Another advantage of the present invention is that the auxiliary control system can execute its logic processing and other evaluative operations and then implement the control decisions independently of the host control program associated with the operation of the PLC main processor.

Another advantage of the present invention is that the auxiliary control system may be used in one configuration to report to the PLC main processor with information detailing the condition of the press machine (which the PLC may use to control the press machine) or, in an alternative configuration, to act independently of the PLC main processor and provide direct control of the press machine.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
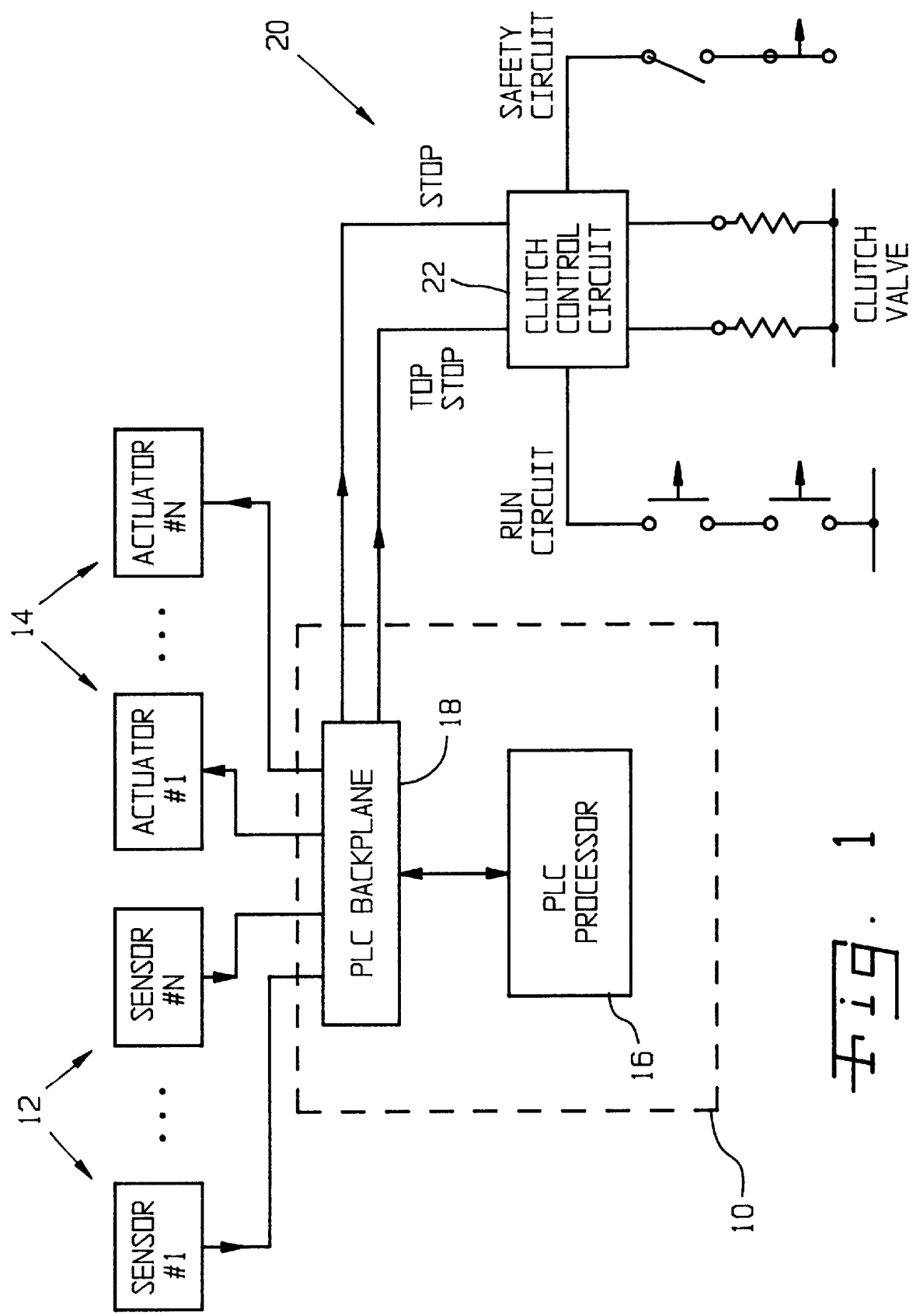
FIG. 1 is a block diagram illustration of a conventional arrangement for a programmable logic controller employed in a press machine.

Referring to FIG. 1 by way of background, there is shown in block diagram format a conventional press controller configuration using a programmable logic controller 10 arranged with an array 12 of sensors #1-N and an array 14 of actuators #1-N to provide an integrated control system capable of monitoring the condition of the press machine and implementing changes to the press operation depending upon an analysis of the monitoring information. PLC 10 includes a processor 16 arranged to communicate with the input/output devices through PLC backplane 18. As known in the art, PLC processor 16 is associated with an executable control program representing logic operation instructions that are formulated with a view towards performing a logic-based analysis of the sensor data to generate control decisions based upon the logic analysis that is used to effect control of the press machine. Sensor array 12 provides sensor information representative of the condition of the press machine and transmits this information over PLC backplane 18 to PLC processor 16. Actuator array 14 includes individual actuator devices arranged to control certain parts and/or devices of the press machine in accordance with a control state thereof. The control commands generated by PLC processor 16, in conjunction with the logic processing of the sensor information according to the control program, is transmitted by PLC processor 16 over PLC backplane 18 to relevant ones of the actuator array 14. Each element of actuator array 14 is integrated with a respective part of the press machine which is to be controlled. For example, illustrative clutch actuator assembly 20 includes a clutch control circuit 22 arranged to interface with the clutch assembly of the press machine and to provide control thereof in response to the control commands issued by PLC processor 16 and communicated over PLC backplane 18. An arrangement of standard I/O cards (not shown) may be used to interface the indicated I/O devices with PLC backplane 18.

One significant drawback to this conventional PLC arrangement derives from the communications set-up in which signals to and from PLC processor 16 must first travel over the PLC backplane 18 in order to reach their destination and complete the respective data transfer. This requirement applies equally to the transmission of sensor information from sensor array 12 to PLC processor 16 and the transmission of control information from PLC processor 16 to actuator array 14. As discussed before, this type of communications arrangement introduces a delay into the operation of the press controller that very likely prevents PLC processor 16 from being able to respond within the mandatory response window demanded by high-speed press operations. The adverse outcome from such a liability can take many forms, including, for example, the destruction of the workpiece, damage to the die assembly, and other types of machine failure. Operation of the press machine using such a PLC-based press controller therefore leaves the press machine vulnerable to catastrophic failures due to undetected malfunctions or an insufficient response time.

Figure 2:
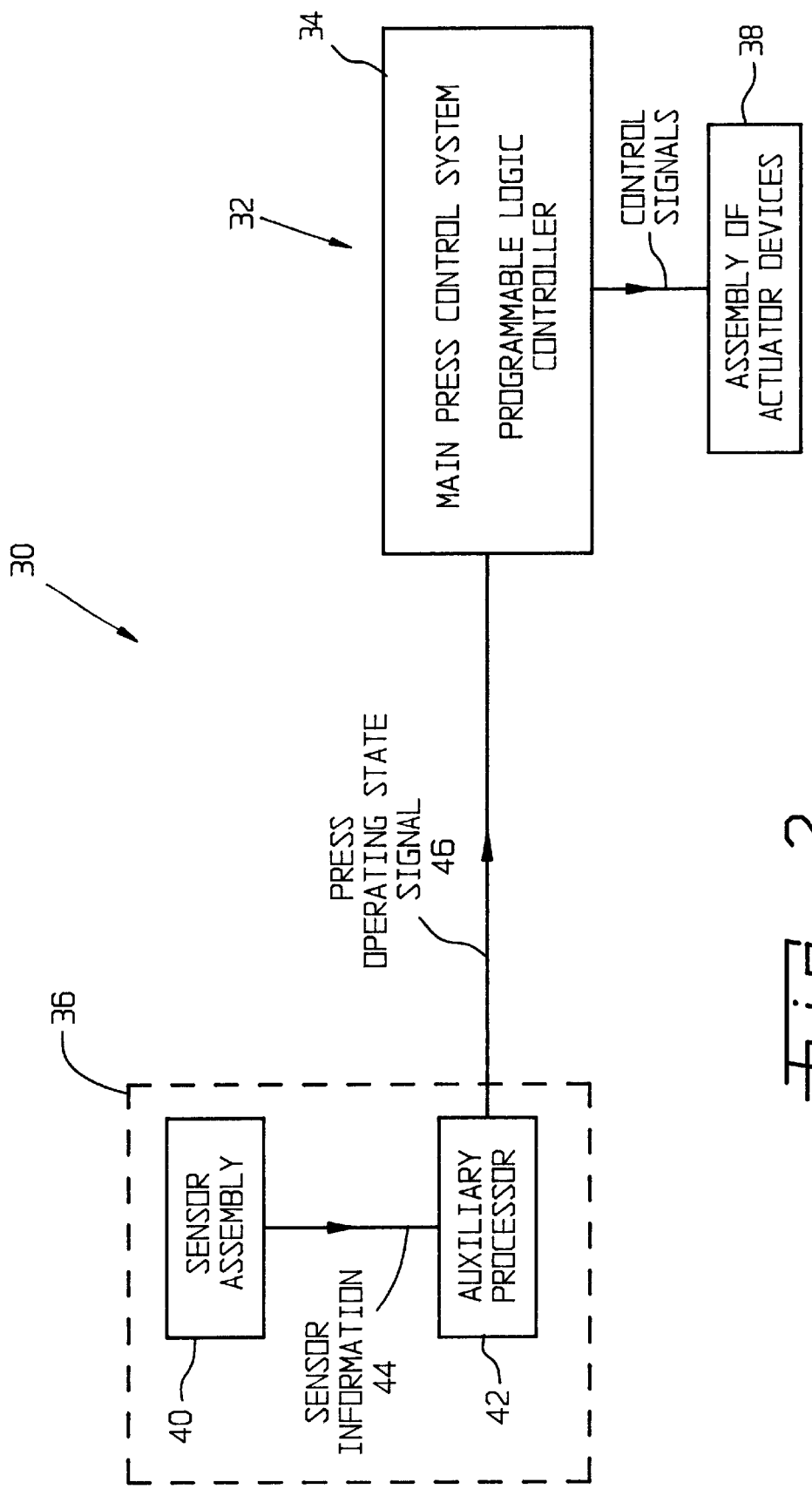
FIG. 2 is a block diagram illustration of a PLC-based press controller for use in controlling a press machine and arranged with an auxiliary control system according to one embodiment of the present invention.

Referring now to FIG. 2, there is shown in block diagram format an integrated press controller 30 including a main press control system 32 employing a programmable logic controller 34 and further including an auxiliary control system 36 according to one embodiment of the present invention. PLC 34 is arranged to communicate with an assembly of actuator devices 38 to implement control of the press machine. Actuator assembly 38 may be provided in any arrangement known to those skilled in the art and should be understood as encompassing any means by which control decisions affecting the operation and control of the press machine may be carried out. Additionally, PLC 34 may be provided in any conventional arrangement known to those skilled in the art and may be operated according to known methodologies. The specific form of PLC 34 and actuator assembly 38 disclosed herein should not be considered in limitation of the present invention but instead should be understood as an illustration thereof.

The illustrated auxiliary control system 36 includes a sensor assembly 40 and a dedicated auxiliary processor 42 that form, in combination, an integrated stand-alone module which is arranged to monitor the condition of the press machine, die assembly, and/or workpiece; evaluate the acquired monitoring data (as represented by the sensor information); and report the results of the evaluation to the main processor in PLC 34, which may then take whatever corrective action is indicated based upon the issued report (e.g., adjust the press machine control inputs to effect a change in the controllable object devices and/or terminate press operation). As used herein and for purposes of brevity, subsequent references to the press machine should be understood as also referring to elements associated with the operation of the press machine, i.e., the die assembly disposed within the press machine and the workpiece subject to processing through the press operation.

The illustrated sensor assembly 40 is arranged to interface with the press machine and provide sensor information 44 representative of the condition of the press machine. Examples of such sensor information 44 may include the crankshaft angle, the condition of the die assembly, the condition of the workpiece, and load data relating to loads developed within the press machine. Sensor assembly 40 may include any type, form, and implementation of sensing devices suitable for use in providing measurement data relating to the performance, condition, and/or operational state of the press machine. It should therefore be apparent that the specific form of sensor assembly 40 disclosed herein should not be considered in limitation of the present invention but instead should be understood as an illustration thereof.

The illustrated auxiliary processor 42 is arranged to analyze and evaluate the sensor information 44 provided by sensor assembly 40 in accordance with a control function embodying evaluation criteria associated with the operation of the press machine. The control strategy that underlies the formation and promulgation of the evaluation criteria generally relates, in one illustrative form thereof, to the development of an analytical mechanism by which the condition of the press machine and its operational aspects can be qualitatively and quantitatively examined or otherwise investigated to produce some type of outcome (e.g., state signal) that reflects and/or incorporates an indicia or measure of the performance and condition of the element or part under observation. This evaluation criteria may be embodied in any of various forms known to those skilled in the art. Examples of such implementations may include a software module supporting a programming function to permit user programming of the control function, a read-only-memory (ROM) or other storage device containing pre-programmed evaluation methodologies, and a hardwired configuration, i.e., a logic circuit defining logic operations to be performed in respect of the sensor information 44. It should be apparent, however, that any suitable form may be used to implement the evaluation criteria.

The illustrated auxiliary processor 42, in one form thereof, preferably executes a monitoring function in which sensor information 44 is reviewed to monitor for the occurrence of at least one press operating event within the press machine as signified by sensor information 44. For this purpose, the evaluation criteria, in a preferred form thereof, is formulated to incorporate and/or constitute a representation of each one of the press operating events. For example, the occurrence of a press operating event may be signified by whether the measurement obtained from a sensing device in regard to a monitored device falls within a permissible range of operating values. An in-range determination means that the device is operating properly (i.e., conforms to the given tolerances and requirements), while a finding that the measurement signifies an out-of-bound condition means that the occurrence of a press operating event has been detected. For the purposes of this illustration, the occurrence of a press operating event is preferably meant to signify that an impermissible condition exists or was experienced by the press machine. Accordingly, at least one of the press operating events preferably defines a non-allowable operating state for the press machine.

The auxiliary processor 42 formulates and issues a press operating state signal 46 representative of the results of the monitoring activity and transmits state signal 46 to the main press control system 32, specifically to the main processor (not shown) in programmable logic controller 34. This transmission enables PLC 34 to control the press machine based, at least in part, upon state signal 46. The action taken by PLC 34 in responding to state signal 46 may range from making on-line controlled adjustments to certain machine devices in order to improve their performance to coordinating a complete shutdown of press machine operation in the event state signal 46 indicates the occurrence of a serious problem warranting such termination.

The illustrated press operating state signal 46 may be provided in various alternative forms. For example, in one illustrative form, state signal 46 may simply provide an indication of which press operating event was detected. Alternatively, state signal 46 may additionally include or represent by itself a judgment or decision signal that reflects the action to be taken by PLC 34 due to the occurrence of an underlying press operating event. Additionally, the judgment component may reflect the type of press operating event being detected. For example, one press operating event may define error conditions (e.g., indicative of a non-performing part) while another press operating event may define warning levels (e.g., a malfunctioning part), in which case a judgment component may be incorporated into state signal 46 in the form of an error signal or warning. Alternatively, if an evaluation indicates the occurrence of an operating event, the decision-making function may formulate a judgment that is expressed in state signal 46 as a control request, i.e., terminate press operation. For this purpose, as part of the monitoring activity, auxiliary processor 42 will preferably be equipped with a functionality that complements or is incorporated into the evaluation methodology and which serves to draw a conclusion (e.g., judgment) based upon the results of the evaluation.

It should be apparent that the evaluation strategy adopted for use with the press machine and undertaken by auxiliary processor 42 may be developed in accordance with any type of contemplated control function. For example, the press operating events may be divided into categories each representing a different priority as it relates to the severity or importance of the press condition for which the sensor measurements are provided to signal their occurrence. The type of control data issued to PLC 34 in response to the occurrence of an operating event would then depend upon the category type of the operating event. One event category, for example, may include expressions (definitions) for press operating events whose occurrence signifies the imminent possibility of catastrophic failure if immediate corrective action is not taken (i.e., press shutdown). Another event category of relatively lower priority may correspond to press operating events whose occurrence will not necessarily impair the functionality of the press machine but which describes an underperforming or malfunctioning device requiring only a control adjustment to restore it to a satisfactory level instead of an immediate suspension of operation. State signal 46 issued by auxiliary processor 42 may therefore constitute a warning or error indication depending upon the underlying operating event to which it corresponds. Although the transmission of state signal 46 to PLC 34 will be necessary when the occurrence of an adverse press operating event is detected, auxiliary processor 42 may continue to issue state signal 46 even when the press is operating at an acceptable level. In this case state signal 46 will reflect a satisfactory performance evaluation and thereby serves as an on-going status indicator continuously present throughout the machining operation.

The illustrated auxiliary control system 36 exhibits a variety of beneficial features compared to its conventional counterpart. Sensor information 44 generated by sensor assembly 40 is communicated directly to auxiliary processor 42. Likewise, press operating state signal 46 generated by auxiliary processor 42 is communicated directly to PLC 34. This form of interconnectivity, particularly between sensor assembly 40 and auxiliary processor 42, enables sensor information 44 to be analyzed in virtual synchronicity with the actual machine conditions which give rise to the measurement data. In particular, the processing activity of auxiliary processor 42 is essentially performed in real-time relative to the underlying press conditions which are being monitored. This functional optimization of the monitoring activity provides PLC 34 with the opportunity to manage and control the press machine essentially on a real-time basis. These aspects compare very favorably to a conventional PLC arrangement such as that shown in FIG. 1 in which the control activity of PLC processor 16 is adversely impacted by the delays inherent in requiring the sensor data from sensor array 12 to travel over PLC backplane 18 before reaching PLC processor 16. No part of the communications channel between sensor assembly 40 and auxiliary processor 42 in the illustrated auxiliary control system 36 is encompassed by the backplane of PLC 34. Additionally, auxiliary processor 42 is preferably connected to the main processor in PLC 34 using a high-speed communications channel.

What auxiliary control system 36 proposes to do is implement in a fully dedicated, stand-alone processing module a functionality that heretofore in conventional systems has been incorporated into the PLC arrangement as simply one part of the overall control activity. The result is an operational unit producing a highly efficient and optimized monitoring activity. In particular, as a stand-alone unit, the illustrated auxiliary control system 36 is capable of executing its range of functions without any further instructions, directions, or guidance from the surrounding computing environment, i.e., PLC 34. In this regard, system 36 forms a dedicated unit whose functionality is specifically tailored to monitoring the condition of the press machine and reporting the results of the monitoring activity to PLC 34. Although it is clear that auxiliary processor 42 may be programmed to perform additional functions, its preferred mode is one of exclusively executing the monitoring activity. Moreover, auxiliary control system 36 preferably operates on a dynamic basis so that sensor information 44 and press operating state signal 46 are being continuously generated.

In one illustrative use of auxiliary control system 36, the monitoring function is specifically formulated to provide die protection by reporting on the condition of a die sensor with respect to a condition of the crankshaft. For this purpose, a press operating event relating to the functioning of a die sensor condition may be represented by a range of permissible values for the position of a machined part for each of a number of crankshaft angles. Additionally, sensor assembly 40 would include an appropriate sensing device to obtain such a machined part position and such an angle measurement. Auxiliary processor 42 would then compare the machined part position measurements provided by sensor assembly 40 against the relevant evaluation criteria (i.e., range of allowable values) specified by the angle measurement provided by sensor assembly 40 and then determine, based upon this comparison, whether a press operating event occurred, namely if the measured machined part position signifies an out-of bound condition. The appropriate form of press operating state signal 46 is transmitted to PLC 34 based upon this event occurrence determination. In particular, if the measured machined part position is out-of-bounds, the press operating state signal 46 may, in the alternative, provide PLC 34 with (i) only a warning level if the machined part position is at an unacceptable level but the degree of departure does not exceed allowable margins; (ii) an error signal if the machined part position does not register with values expected for normal operation; and/or (iii) a control signal to implement shutdown if the machined part position is completely out-of-bounds. It should be apparent that any number and type of press operating events may be defined along with developing any form of state signal 46 (e.g., warning, error, control signal).

Figure 3:
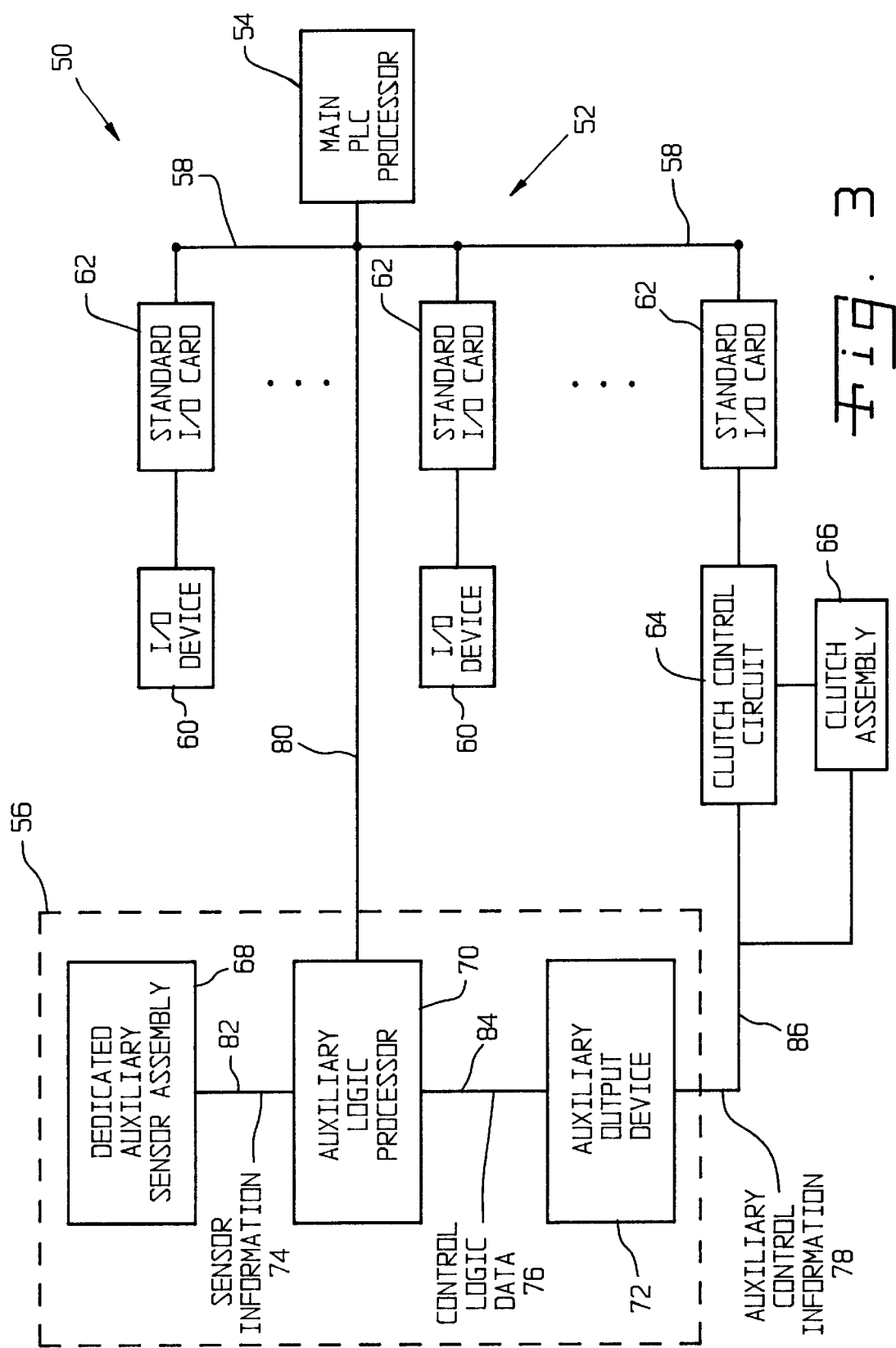
FIG. 3 is a block diagram illustration of a programmable logic controller for use in controlling a press machine and including an independently operable auxiliary control system according to another embodiment of the present invention.
Figure 4:
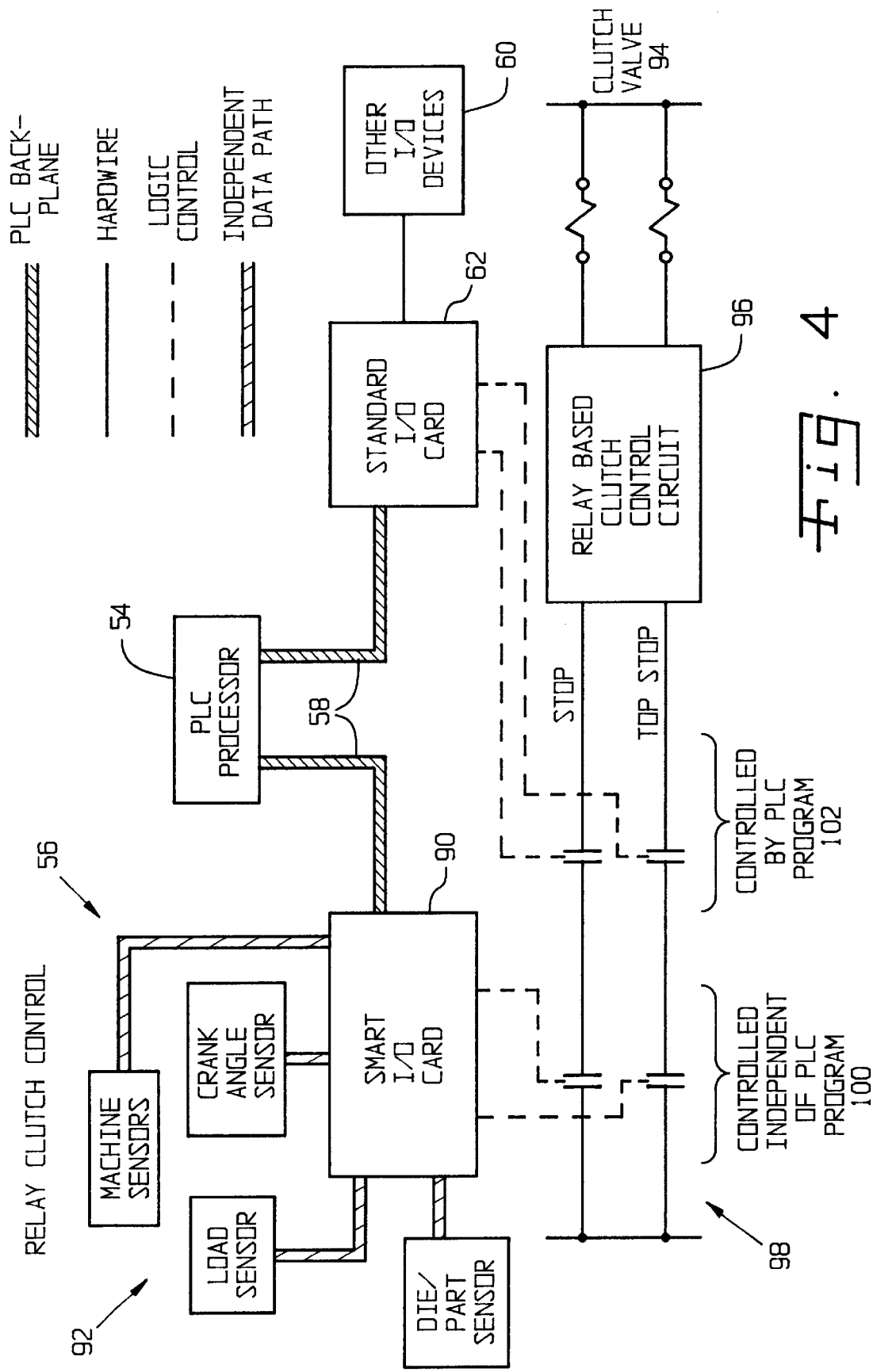
FIG. 4 is a block diagram illustration of the PLC arrangement shown in FIG. 3 as configured in one illustrative implementation thereof to provide control of a relay-based clutch control circuit integral with the clutch assembly of the press machine.
Figure 5:
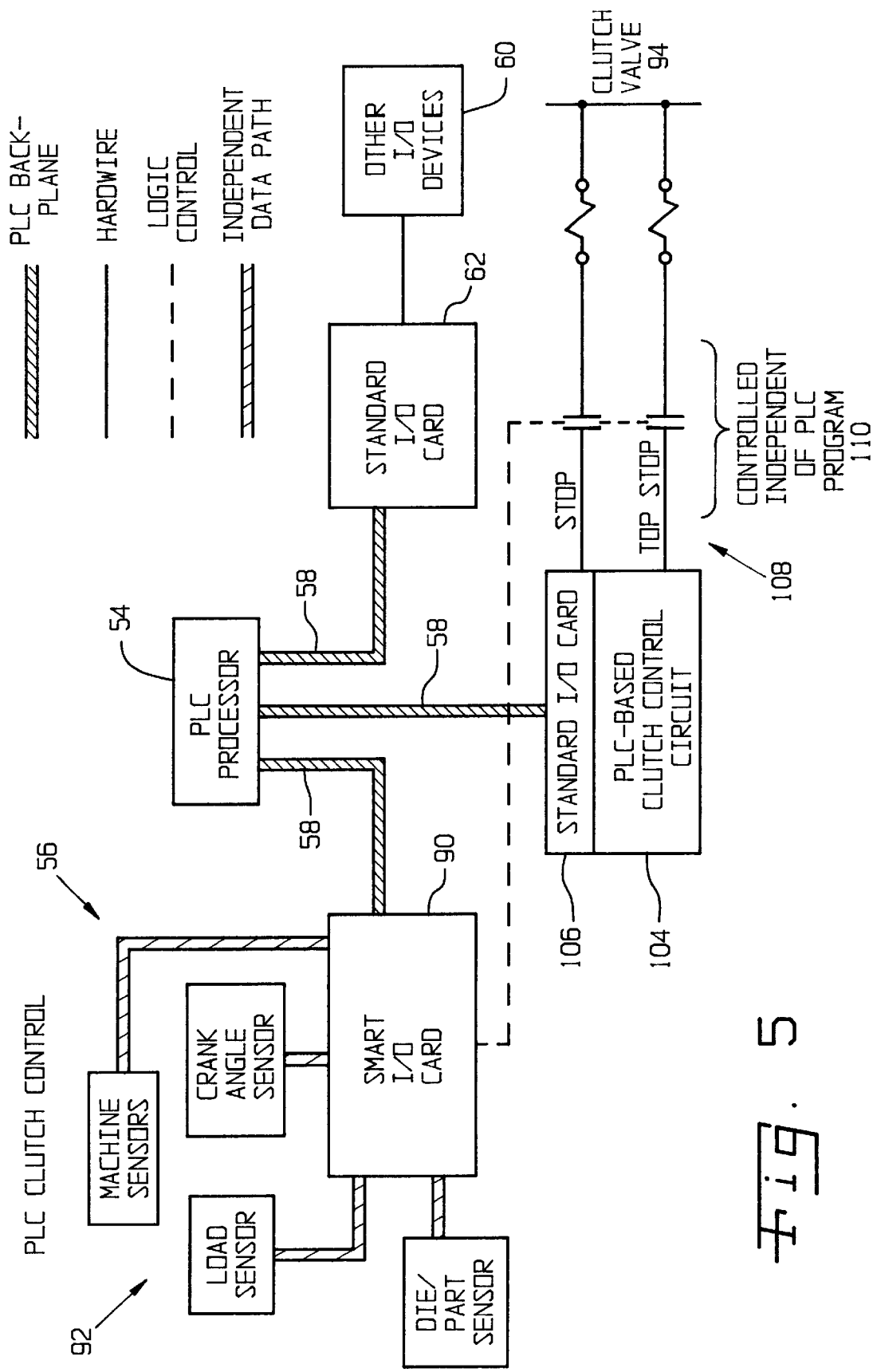
FIG. 5 is a block diagram illustration of the PLC arrangement shown in FIG. 3 as configured in another illustrative implementation thereof to provide control of a PLC-based clutch control circuit integral with the clutch assembly.

Referring now to FIGS. 3–5, there is first shown in FIG. 3 a block diagram illustration of a programmable logic controller 50 comprising a host PLC arrangement 52 including a main PLC processor 54 and further comprising an auxiliary control system 56 provided in accordance with another embodiment of the present invention and operatively associated with host PLC arrangement 52. FIGS. 4 and 5 illustrate alternative configurations for PLC 50 with respect to implementations involving a clutch control circuit interfaced with a press machine clutch assembly. The illustrated auxiliary control system 56 and host PLC arrangement 52 provide alternative and independent means by which programmable logic controller 50 can effect control of a mechanical press machine. Representing an enhancement of auxiliary control system 36 disclosed in FIG. 2, the illustrated auxiliary control system 56 of FIG. 3 evaluates sensor information supplied by a respective sensor assembly and implements the logic-based evaluation results in a manner that accomplishes direct control of the press machine.

The host PLC arrangement 52 is illustratively provided in a conventional configuration in which PLC processor 54 is arranged for connection with plural I/O devices 60 over PLC backplane 58 in a manner and form known to those skilled in the art. Standard I/O cards 62 are provided as interface circuits for interfacing I/O devices 60 to PLC backplane 58. The specific configuration of host PLC arrangement 52 does not form part of the present invention and accordingly any description thereof should not be considered in limitation of the present invention. Furthermore, it should be apparent that the indicated design of host PLC arrangement 52 is shown for illustrative purposes only and that any form or type of programmable logic controller system may be provided in association with auxiliary control system 56 of the present invention. Additionally, although auxiliary control system 56 is shown as being an integral part of programmable logic controller 50, the present invention is not so limited. Rather, the present invention should be understood as encompassing the integration of auxiliary control system 56 in the manner described hereinafter within other suitable press machine control systems known in the art.

I/O devices 60, in one illustrative form thereof, include a data input means for supplying input data for use by main PLC processor 54 in executing its control program. I/O devices 60 may further include an output means for implementing control of an object to be controlled in response to control signals provided by main PLC processor 54. For example, main PLC processor 54 is illustratively arranged to provide clutch control signals to an I/O device in the form of a clutch control circuit 64 which actuatively controls a clutch assembly 66 of the press machine. As discussed below, auxiliary control system 56 provides an independent means by which to supply clutch control circuit 64 with the necessary command control information. The PLC data input means encompassed by I/O devices 60 may include sensor devices or other means by which information, preferably of the type representing the condition of the machine, is generated for use by PLC processor 54 in its execution of an associated control program as known to those skilled in the art. In particular, PLC processor 54, in a conventional manner relating to the operation of a press machine, performs logic operations on input data in accordance with an associated control program defining logic operation instructions to generate therefrom control logic data for use in controlling the press machine. This control program may be provided by any conventional means known to those skilled in the art, including a separate programming unit (not shown) which may load the program into a memory area (not shown) that is accessed by PLC processor 54 to facilitate execution of the control program logic operations instructions.

Referring to the illustrated auxiliary control system 56, there is provided, in integral combination, a dedicated auxiliary sensor assembly 68, an auxiliary logic processor 70, and an auxiliary output device 72. The illustrated sensor assembly 68 includes an arrangement of sensor devices for providing sensor information 74 representative of the condition of the press machine, the die assembly disposed within the press machine, workpiece, and/or other operating features of the press machine processing activity. Sensor assembly 68 is considered a dedicated unit because it is associated specifically with auxiliary control system 56. One distinguishing feature of sensor assembly 68 is that it does not form part of any I/O device 60 connected over PLC backplane 58 to PLC processor 54 (i.e., sensor assembly 68 is discrete from PLC I/O devices 60).

The illustrated auxiliary logic processor 70, in one form thereof, is arranged to perform logic operations with respect to sensor information 74 provided by auxiliary sensor assembly 68 to provide control information in the form of control logic data 76 for use in controlling the press machine. Auxiliary logic processor 70, in an alternative form thereof, may be considered as embodying an execution facility that executes an auxiliary control function in respect of sensor information 74 to provide control information in the form of control logic data 76 based upon the auxiliary control function execution results for use in controlling the press machine. This auxiliary control function associated with the operation of auxiliary logic processor 70 includes logic operations relating to the control of the press machine. Execution of the auxiliary control function therefore involves carrying out the underlying logic operations in relation to sensor information 74. The control function generally defines an analytic methodology by which the monitoring data provided by sensor assembly 68 (i.e., sensor information 74) can be evaluated in terms of evaluation criteria and then translated into press machine command control information based upon the evaluation results. The control function, in one form thereof, is implemented in the form of logic-based operations that utilize sensor information 74, at least in part, as their input variables, such that the logic processing of sensor information 74 produces control logic data that reflects the manner of controlling the press machine based upon the logic processing results. The logic-based operations may be embodied in various alternative forms, including a software implementation and a hardware implementation (i.e., a logic circuit) of conventional formulation as known to those skilled in the art. Auxiliary logic processor 70 may be connected to PLC processor 54 over a connection channel 80 that may form part of PLC backplane 58.

The auxiliary logic processor 70, in one form thereof, is connected to PLC processor 54 over a connection channel 80 that my form part of PLC backplane 58. Through connection channel 80 the PLC processor 54 communicates signals necessary to select from one of at least one analytical methodology or evaluation criterion (e.g., limits for the determination of an out-of-bounds value) by which the monitoring date provided by sensor assembly 68 can be evaluated.

The illustrated auxiliary output device 72 provides an interface means by which the control logic data 76 supplied by auxiliary logic processor 70 is applied as auxiliary control information 78, in one form thereof, to the integral combination of clutch control circuit 64 and clutch assembly 66. It should be apparent, however, that auxiliary control system 56 may be integrally arranged with various other parts of the press machine in addition to clutch assembly 66, in which case auxiliary control information 78 will be available to be received by other individual machine devices and/or actuator assemblies integral with the machine parts to be controlled. Auxiliary output device 72 provides whatever suitable interfacing arrangement of conventional type is needed to integrate auxiliary control system 56 with the press machine devices to be controlled. As will be described in relation to FIGS. 4–5, auxiliary control system 56 may be directly connected to the actuator assembly (i.e., clutch control circuit 64) or directly interfaced to clutch assembly 66.

The integration of auxiliary control system 56 into programmable logic controller 50 represents a significant advance over conventional PLC arrangements associated with the control of mechanical press machines. Referring to host PLC arrangement 52, the control activity undertaken by PLC processor 54 requires at an input end the reception of machine monitoring data from the appropriate I/O devices 60 (e.g., a host sensor assembly) and requires at an output end the transmission of control signals to the appropriate I/O devices (e.g., press machine actuators). This transfer of information to and from host PLC arrangement 52 occurs over PLC backplane 58, which as noted hereinbefore introduces an unacceptable amount of delay into the control activity particularly in regard to high-speed press operations. By comparison, sensor information 74 generated by dedicated auxiliary sensor assembly 68 is transmitted directly to auxiliary logic processor 70 over a communications channel 82 that forms no part of PLC backplane 58, i.e., channel 82 is discrete from PLC backplane 58. Likewise, control logic data 76 supplied by auxiliary logic processor 70 is transmitted directly to auxiliary output device 72 over,a communications channel 84 that forms no part of PLC backplane 58, i.e., channel 84 is discrete from PLC backplane 58. Communications channels 82 and 84 may be provided in the form of direct electrical connections. Auxiliary output device 72 is arranged for connection with clutch control circuit 64 and/or clutch assembly 66 over connecting line 86.

This type of direct signal transmission to and from auxiliary logic processor 70 involving sensor information 74 and control logic data 76 means that the delay heretofore associated with communicating over PLC backplane 58 is completely eliminated. As a result, auxiliary control system 56 offers a significant increase in response time vis-à-vis the detection of an abnormal condition in the press machine (as signified by sensor information 74) and the implementation of a control decision through the application of auxiliary control information 78 resulting from the operation of auxiliary logic processor 70. This form of direct signal transmission, moreover, enables auxiliary control system 56 to provide its control activity on an essentially real-time basis relative to the press operating conditions which are being monitored and evaluated.

Additionally, the logic processing performed by auxiliary logic processor 70 is conducted independently of the control program associated with the operation of PLC processor 54, thus avoiding the delay that would inevitably accompany the need to download logic operations instructions from PLC processor 54 to auxiliary logic processor 70 over connection channel 80 (e.g., a part of PLC backplane 58). For this reason, namely that auxiliary logic processor 70 is equipped to undertake its logic control activity independently of the control program associated with PLC processor 54, the illustrated auxiliary control system 56 is considered to function as a "smart" module in which it is arranged to operate in a stand-alone configuration and can provide control of the press machine in a parallel manner to that offered by host PLC arrangement 52.

Referring now to FIGS. 4 and 5, there are respectively shown alternative arrangements for programmable logic controller 50 of FIG. 3 utilizing a relay-based and a PLC-based implementation for clutch control circuit 64 interfaced to clutch assembly 66. As used in FIGS. 4 and 5, smart I/O card 90 represents a modular control logic device that incorporates the functionality of auxiliary logic processor 70 and auxiliary output device 72 of FIG. 3 into an integral unit connected to an array 92 of sensing devices. Sensor array 92 illustratively includes sensors to measure crank angle, part position, part quality, die assembly position, and press frame load, although it should be apparent that other sensors conventionally used in press machine applications may be a part of sensor array 92. Each of the sensors preferably provides sensor information to smart I/O card 90 over an independent data path.

FIG. 4 is a block diagram illustration of a programmable logic controller employing auxiliary control system 56 of the present invention in which clutch valves (generally illustrated at 94) for controlling a clutch assembly are actuatively integrated with a relay-based clutch control circuit 96 of conventional construction. Circuit 96, as understood by those skilled in the art, includes signals that when activated cause the press machine to stop immediately (i.e., "STOP" control) or to stop at the top of slide travel (i.e., "TOP STOP"). As shown diagrammatically by connection circuit 98 at the input side of relay-based clutch control circuit 96, control logic inputs are provided separately from PLC processor 54 and smart I/O card 90 to independently effect a change in the control state of control circuit 96 and thereby produce a desired actuation of clutch valves 94. In particular, the control logic inputs supplied by smart I/O card 90 (illustrated generally at 100) provide state control of circuit 96 in a manner that is independent of the PLC program associated with the operation of PLC processor 54, which provides state control of circuit 96 via control logic inputs illustrated generally at 102.

FIG. 5 is a block diagram illustration of a programmable logic controller employing auxiliary control system 56 of the present invention in which clutch valves 94 are actuatively integrated with a PLC-based clutch control circuit 104. Circuit 104, as understood by those skilled in the art, includes signals that when activated cause the press machine to stop immediately (i.e., "STOP" control) or to stop at the top of slide travel (i.e., "TOP STOP"). Host PLC processor 54, in a conventional manner, obtains input signals bearing upon the operation of the clutch assembly from an input card (e.g., an input device 60 connected to PLC processor 54 via standard I/O card 62) and, through a programmed logic operation, determines the state of control output signals for use in controlling the clutch assembly. These control output signals from PLC processor 54 are provided over PLC backplane 58 to drive the output portion of a standard I/O card 106 provided in combination with PLC-based clutch control circuit 104. I/O card 106 applies the PLC control signals to clutch valves 94 for selective activation/deactivation depending upon the state thereof. As shown diagrammatically by connection circuit 108 at the output side of PLC-based clutch control circuit 104, clutch control information from auxiliary control system 56 is applied directly to clutch valves 94. In particular, the logic control inputs from smart I/O card 90 (generally illustrated at 110) directly command clutch valves 94. This direct control feature follows from a configuration in which smart I/O card 90 (at the output portion thereof) is interfaced to the PLC-based clutch control circuit 104 between standard I/O card 106 and clutch valves 94, enabling auxiliary control system 56 of the present invention to activate/deactivate clutch valves 94 independently of PLC processor 54 and the programmed control logic operations associated therewith.

Of particularly noteworthiness in FIGS. 4 and 5 is the fact that PLC processor 54 employs PLC backplane 58 both to receive press monitoring data (i.e., from I/O devices 60) and to transmit control data to the actuator assembly (i.e., clutch control circuits). However, according to the present invention, auxiliary control system 56 provides a direct throughput of information from sensor array 92 to smart I/O card 90 and then on to the actuator assembly or machine device (i.e., clutch valves). No part of PLC backplane 58 is used in this delivery of sensor data and control commands by auxiliary control system 56.

Although FIGS. 4 and 5 disclose a single smart I/O card 90, this disclosure should not be considered in limitation of the present invention but as merely illustrative thereof. Accordingly, auxiliary control system 56 of the present invention may encompass a plurality of such smart I/O cards 90 each arranged with a respective or shared sensor array 92. Furthermore, each smart I/O card 90 may be integrated with any of the press machine parts or actuator assemblies associated with the control activity for the press machine. With respect to its implementation in regard to clutch valves 94, it is apparent that auxiliary control system 56 of the present invention provides a control mechanism for the clutch assembly that enables execution of the control process independently of the PLC control program associated with PLC processor 54. This functional independence may be implemented in an equivalent manner and with the same results for any other part of the press machine in addition to the clutch assembly.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A control system for use with a press machine, said control system comprising:

a press controller arranged to control said press machine, said press controller comprising a programmable logic controller including a main processor;

sensor means for providing sensor information representative of the condition of at least one of said press machine and a die assembly disposed within said press machine;

an auxiliary processor arranged to monitor for the occurrence of at least one press operating event as signified by the sensor information provided by said sensor means and to provide a state signal representative of the results of the monitoring activity; and means for providing said press controller with the state signal provided by said auxiliary processor to enable said press controller to control said press machine based, at least in part, upon said state signal.

2. The control system as recited in claim 1, wherein at least one of the at least one operating event defines a non-allowable operating state for said press machine.

3. The control system as recited in claim 2, wherein said press controller effects a termination of press machine operation in response to a state signal from said auxiliary processor which indicates the occurrence of an operating event associated with a non-allowable operating state.

4. The control system as recited in claim 1, wherein the sensor information provided by said sensor means includes a measure of the crankshaft angle for said press machine, additionally, wherein the sensor information provided includes a measure of some other press machine condition, and wherein one of the at least one press operating event associated with a non-allowable operating state defines unacceptable values for said press machine condition for the measured crankshaft angle.

5. The control system as recited in claim 1, further comprises:

connection means for providing a communications path between said sensor means and said auxiliary processor;

wherein said connection means is discrete from a signal bus defining, at least in part, a backplane of said programmable logic controller.

6. The control system as recited in claim 1, wherein the sensor information provided by said sensor means represents at least one of a crankshaft angle, the condition of said die assembly, the condition of a workpiece subject to processing by said press machine, and load data relating to loads developed within said press machine.

7. The control system as recited in claim 1, wherein said auxiliary processor is disposed discrete from said die assembly.

8. A system for use in a press machine and operatively associated with a press controller arranged to control said press machine, said system comprising:

sensor means for providing sensor information representative of the condition of at least one of said press machine and a die assembly disposed within said press machine;

monitoring means for monitoring for the occurrence of at least one press operating event using the sensor information provided by said sensor means and for generating a state signal representative of the results of the monitoring activity; and means for providing said press controller with the state signal generated by said monitoring means to enable said press controller to control said press machine based, at least in part, upon said state signal.

9. The system as recited in claim 8, wherein at least one of the at least one operating event defines a non-allowable operating state for said press machine.

10. The control system as recited in claim 9, wherein the sensor information provided by said sensor means includes a measure of the crankshaft angle for said press machine, additionally, wherein the sensor information provided includes a measure of some other press machine condition, and wherein one of the at least one press operating event associated with a non-allowable operating state defines unacceptable values for the crankshaft angle.

11. The system as recited in claim 9, wherein said press controller acts to terminate press machine operation in response to a state signal from said monitoring means which indicates the occurrence of a press operating event associated with a non-allowable operating state.

12. The system as recited in claim 8, wherein:
said press controller further comprises a programmable logic controller including a main processor; and
said monitoring means further comprises an auxiliary processor.

13. The system as recited in claim 12, wherein the action of said auxiliary processor in conducting the monitoring activity relative to the at least one operating event is independent of said programmable logic controller.

14. The system as recited in claim 12, further comprises:
connection means for providing a communications path between said sensor means and said auxiliary processor of said monitoring means;
wherein said connection means is discrete from a signal bus defining, at least in part, a backplane of said programmable logic controller.

15. The system as recited in claim 12, wherein said auxiliary processor is disposed discrete from said die assembly.

16. A system for use in a press machine and operatively associated with a programmable logic controller arranged to control said press machine and including a main processor, said system comprising:
a sensor means for providing sensor information representative of the condition of at least one of said press machine and a die assembly disposed within said press machine;
an auxiliary processor means for evaluating the sensor information provided by said sensor means according to evaluation criteria associated with the operation of said press machine and for providing a state signal representative of the evaluation results; and
means for communicating the state signal provided by said auxiliary processor means to said programmable logic controller to enable control of said press machine by said programmable logic controller based, at least in part, upon said state signal.

17. The system as recited in claim 16, wherein the evaluation criteria associated with the operation of said auxiliary processor means incorporates representations of at least one press operating event for said press machine.

18. The system as recited in claim 17, wherein the evaluation performed by said auxiliary processor means monitors for the occurrence of the at least one press operating event and provides an event indicator in said state signal when the occurrence of an operating event is detected.

19. The system as recited in claim 18, wherein at least one of the at least one press operating event defines a non-allowable operating state for said press machine.

20. The system as recited in claim 19, wherein said programmable logic controller effects a termination of press machine operation upon receipt from said auxiliary processor means of a state signal including an event indicator associated with a non-allowable operating state.

21. The system as recited in claim 16, further comprises:
connection means for providing a communications path between said sensor means and said auxiliary processor means;
wherein said connection means is discrete from a signal bus defining, at least in part, a backplane of said programmable logic controller.

22. The system as recited in claim 21, wherein said auxiliary processor means is disposed discrete from said die assembly and wherein said connection means is disposed discrete from said die assembly.

23. A method of controlling a press machine, said method operatively associated with a press controller arranged to control said press machine, said method comprising the steps of:
sensing the condition of at least one of said press machine and a die assembly disposed within said press machine and generating sensor information representative thereof;
monitoring the generated sensor information for the occurrence of at least one press operating event as signified by said sensor information and providing a state signal representative of the results of the monitoring activity, wherein at least one of the at least one press operating event defines a non-allowable operating state for said press machine; and
providing said state signal to said press controller to enable control of said press machine in accordance therewith.

24. The method as recited in claim 23, wherein said press controller further comprises:
a programmable logic controller including a main processor.

25. The method as recited in claim 24, wherein said monitoring step further comprises the step of:
providing an auxiliary processor arranged to receive said sensor information and to perform the press operating event monitoring activity.

26. The method as recited in claim 25, wherein the action of said auxiliary processor in performing the monitoring activity relative to the at least one operating event is independent of said programmable logic controller.

27. A method of controlling a press machine, said method operatively associated with a press controller, said press controller comprising a programmable logic controller arranged to control said press machine and including a main processor, said method comprising the steps of:
providing a sensor assembly to detect the operating condition of at least one of said press machine and a die assembly disposed within said press machine and generating sensor information representative thereof;
evaluating the generated sensor information according to evaluation criteria associated with the operation of said press machine and providing a state signal indicative of the results of said evaluation activity; and
providing said state signal to said press controller to enable control of said press machine in accordance therewith.

28. The method as recited in claim 27, wherein said evaluation step further includes the step of:
monitoring for the occurrence of at least one press operating event as signified by the generated sensor information, wherein at least one of the at least one press operating event defines a non-allowable operating state for said press machine.

29. The method as recited in claim 27, wherein said evaluation step further includes the step of:
   providing an auxiliary processor arranged to receive said sensor information and to perform said evaluation activity.

30. The method as recited in claim 29, wherein the action of said auxiliary processor in performing said evaluation activity relative to the generated sensor information is independent of said programmable logic controller.

31. An auxiliary control system for use with a press machine, said auxiliary control system associated with a press controller arranged to control said press machine, said press controller including an actuator assembly arranged to provide control of devices of said press machine in accordance with control signals applied thereto and further including a programmable logic controller arranged to operatively control said actuator assembly, said programmable logic controller comprising a host processor having an executable control program associated therewith, said auxiliary control system comprising:
   an auxiliary sensor assembly for providing sensor signals representative of the condition of at least one of said press machine and a die assembly disposed within said press machine;
   an auxiliary logic processor, operatively associated with a control function defining logic operations, for carrying out said logic operations in relation to the sensor signals provided by said auxiliary sensor assembly to generate therefrom control signals enabling control of said press machine; and
   an auxiliary output device arranged to interface said auxiliary logic processor to said actuator assembly.

32. The auxiliary control system as recited in claim 31, wherein the press machine control activity performed by said auxiliary logic processor is independent of the executable control program associated with the operation of said host processor of said programmable logic controller.

33. The auxiliary control system as recited in claim 31, wherein said auxiliary logic processor further includes:
   a logic circuit.

34. The auxiliary control system as recited in claim 31, wherein said press controller further comprises:
   a data means for providing said programmable logic controller with press monitoring information representative of the condition of said press machine;
   wherein said auxiliary sensor assembly is discrete from said data means.

35. The auxiliary control system as recited in claim 31, further comprises:
   an auxiliary connection means for connecting said auxiliary logic processor to said auxiliary sensor assembly and for connecting said auxiliary logic processor to said auxiliary output device;
   wherein said auxiliary connection means is discrete from a signal bus defining, at least in part, a backplane of said programmable logic controller.

36. The auxiliary control system as recited in claim 31, wherein said actuator assembly further comprises:
   a clutch control circuit arranged to control a clutch assembly of said press machine and having a signal input side and a signal output side.

37. The auxiliary control system as recited in claim 36, wherein said clutch control circuit further comprises:
   a relay assembly having control inputs and control outputs and operatively arranged to provide clutch control signals along the control outputs thereof in dependence upon the state of the control inputs thereof.

38. The auxiliary control system as recited in claim 36, wherein said clutch control circuit further comprises:
   an output means for providing an interface between the host processor of said programmable logic controller and said clutch assembly and having signal inputs and signal outputs, said output means responsive to the state of the signal inputs thereof as determined by said host processor for applying clutch control signals on the signal outputs thereof to said clutch assembly.

39. The auxiliary control system as recited in claim 38, wherein said auxiliary logic processor is arranged to communicate directly with said clutch assembly.

40. The auxiliary control system as recited in claim 39, wherein said auxiliary logic processor communicates control signals for said clutch assembly to the signal output side of said clutch control circuit.

41. A programmable logic controller for use in controlling a press machine, said programmable logic controller operatively associated with a machine control assembly arranged to provide control of devices of said press machine in accordance with the control state thereof, said programmable logic controller including a central processor for executing a control program in relation to input data to generate control data based upon the control program execution results for use in controlling said press machine, said programmable logic controller further comprising:
   an auxiliary sensor means for providing sensor information representative of the condition of at least one of said press machine and a die assembly disposed within said press machine;
   an auxiliary processor means for executing an auxiliary control function in respect of sensor information provided by said auxiliary sensor means to provide control information based upon the auxiliary control function execution results for use in controlling said press machine; and
   an auxiliary output means for applying control signals representative of the control information provided by said auxiliary processor means to said machine control assembly to enable control of said press machine.

42. The programmable logic controller as recited in claim 41, wherein the press machine control activity performed by said auxiliary processor means is independent of the control program associated with the operation of said central processor.

43. The programmable logic controller as recited in claim 41, wherein the auxiliary control function associated with the operation of said auxiliary processor means includes logic operations.

44. The programmable logic controller as recited in claim 43, wherein said auxiliary processor means further comprises:
   a logic circuit.

45. The programmable logic controller as recited in claim 41, further comprises:
   an auxiliary connection means for connecting said auxiliary processor means to said auxiliary sensor means and for connecting said auxiliary processor means to said auxiliary output means;
   wherein said auxiliary connection means is discrete from a signal bus defining, at least in part, a backplane of said programmable logic controller.

46. The programmable logic controller as recited in claim 41, further comprises:
  a data assembly for providing said central processor with monitoring information representative of the condition of said press machine;
  wherein said auxiliary sensor means is discrete from said data assembly.

47. The programmable logic controller as recited in claim 41, wherein said machine control assembly further comprises:
  a clutch control circuit arranged to control a clutch assembly of said press machine and having a signal input side and a signal output side.

48. The programmable logic controller as recited in claim 47, wherein said clutch control circuit further comprises:
  an output means for providing an interface between said central processor and said clutch assembly and having signal inputs and signal outputs, said output means responsive to the state of the signal inputs as determined by said central processor for applying clutch control signals on the signal outputs thereof to said clutch assembly.

49. The programmable logic controller as recited in claim 48, wherein said auxiliary processor means is arranged to communicate directly with said clutch assembly.

50. The programmable logic controller as recited in claim 49, wherein said auxiliary processor means communicates control signals for said clutch assembly to the signal output side of said clutch control circuit.

51. A control system for use in controlling a press machine, said control system comprising:
  a device control assembly, including an actuator assembly, arranged to provide control of devices of said press machine in accordance with a control state thereof;
  a data means for providing press monitoring information representative of the condition of said press machine;
  a programmable logic controller arranged to operate said device control assembly, said programmable logic controller comprising:
  a main processor operatively associated with an executable control program,
  an input/output means for interfacing said main processor with said data means and for interfacing said main processor with said device control assembly, and
  a signal bus defining, at least in part, a backplane of said programmable logic controller for connecting said main processor with said input/output means;
  said programmable logic controller further comprising:
  an auxiliary sensor means for providing sensor information representative of the condition of at least one of said press machine and a die assembly disposed within said press machine,
  an auxiliary processor means for performing logic operations with respect to the sensor information provided by said auxiliary sensor means to provide control information based upon the logic operations performance results for use in controlling said press machine, and
  an auxiliary output means for interfacing said auxiliary processor means to said device control assembly.

52. The control system as recited in claim 51, wherein the press machine control activity performed by said auxiliary processor means is independent of the executable control program associated with the operation of said main processor.

53. The control system as recited in claim 51, further comprising:
  auxiliary connection means for connecting said auxiliary processor means to said auxiliary sensor means and for connecting said auxiliary processor means to said auxiliary output means;
  wherein said auxiliary connection means is discrete from said signal bus.

54. The control system as recited in claim 51, wherein said auxiliary sensor means is discrete from said data means.

55. A programmable logic controller for use in controlling a press machine, said programmable logic controller operatively associated with a device control assembly arranged to control devices of said press machine in accordance with a control state thereof, said programmable logic controller comprising:
  a main processor;
  an auxiliary sensor means for providing sensor information representative of the condition of at least one of said press machine and a die assembly disposed within said press machine;
  an auxiliary logic processor means arranged to perform logic operations in respect of the sensor information provided by said auxiliary sensor means and to generate control signals based upon the logic operations performance results for use in controlling said press machine; and
  an auxiliary output device arranged to interface said auxiliary logic processor means with said device control assembly to enable communication therebetween.

56. The programmable logic controller as recited in claim 55, wherein the press machine control activity conducted by said auxiliary logic processor means is independent of an executable control program associated with the operation of said main processor.

* * * * *